United States Patent [19]

Suzuki et al.

[11] Patent Number: 4,833,358
[45] Date of Patent: May 23, 1989

[54] VIBRATION WAVE MOTOR

[75] Inventors: Nobuyuki Suzuki, Yokohama; Masao Shimizu, Kawasaki; Mitsuhiro Katsuragawa, Tanashi, all of Japan

[73] Assignee: Canon Kabushiki Kaisha, Tokyo, Japan

[21] Appl. No.: 133,255

[22] Filed: Dec. 14, 1987

Related U.S. Application Data

[63] Continuation of Ser. No. 915,429, Oct. 6, 1986, abandoned.

[30] Foreign Application Priority Data

Oct. 9, 1985 [JP] Japan .................................. 60-226566
Jan. 17, 1986 [JP] Japan ..................................... 61-8626

[51] Int. Cl.$^4$ ............................................. H01L 41/08
[52] U.S. Cl. ..................... 310/316; 310/317; 310/323; 310/328
[58] Field of Search ............... 310/316, 317, 323, 328; 318/116, 118

[56] References Cited

U.S. PATENT DOCUMENTS

| | | | |
|---|---|---|---|
| 4,291,274 | 9/1981 | Suzuki et al. | 328/133 |
| 4,484,099 | 11/1984 | Kawai et al. | 310/323 X |
| 4,491,401 | 1/1985 | Inaba et al. | |
| 4,495,432 | 1/1985 | Katsuma et al. | |
| 4,504,760 | 3/1985 | Yamamoto et al. | |
| 4,510,411 | 4/1985 | Hakamata et al. | 310/323 X |
| 4,513,291 | 4/1985 | Drabowitch. | |
| 4,560,263 | 12/1985 | Katsuma et al. | |
| 4,580,073 | 4/1986 | Okumura et al. | |
| 4,587,452 | 5/1986 | Okumura et al. | |
| 4,645,964 | 2/1987 | Hiramatsu et al. | 310/323 |
| 4,649,311 | 3/1987 | Mukohjima et al. | 310/323 |
| 4,658,172 | 4/1987 | Izukawa | 310/316 |
| 4,678,956 | 7/1987 | Izukawa et al. | 310/323 |
| 4,692,649 | 9/1987 | Izukawa | 310/323 X |
| 4,713,571 | 12/1987 | Suzuki et al. | 310/316 |
| 4,727,276 | 2/1988 | Izukawa et al. | 310/323 X |

FOREIGN PATENT DOCUMENTS

| | | |
|---|---|---|
| 3406408 | 8/1984 | Fed. Rep. of Germany. |
| 0204477 | 11/1984 | Japan ................................ 310/323 |
| 61-251490 | 11/1986 | Japan. |
| 2008809 | 6/1979 | United Kingdom. |
| 2146806 | 4/1985 | United Kingdom. |

OTHER PUBLICATIONS

Abstract for Japanese Patent No. (11) 61-251490.

Primary Examiner—Mark O. Budd
Attorney, Agent, or Firm—Fitzpatrick, Cella, Harper & Scinto

[57] ABSTRACT

A vibration wave motor for driving a movable member by a travelling vibration wave generated by applying a periodic signal to an electro-mechanical energy transducer element such as an electrostrictive device or piezoelectric device is disclosed. A drive status of the vibration wave motor is detected, a phase difference between the detected signal and the periodic signal applied to the transducer element is detected, a frequency of the periodic signal is selected such that the phase difference is equal to a predetermined constant and the vibration wave motor is driven in a resonance state.

53 Claims, 10 Drawing Sheets

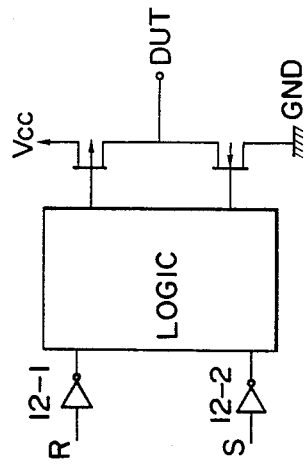
FIG.8
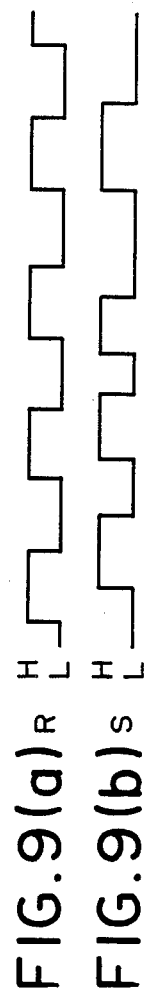
FIG.9(a) R
FIG.9(b) S
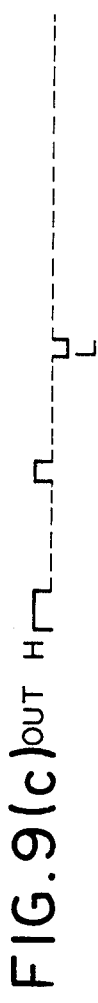
FIG.9(c) OUT

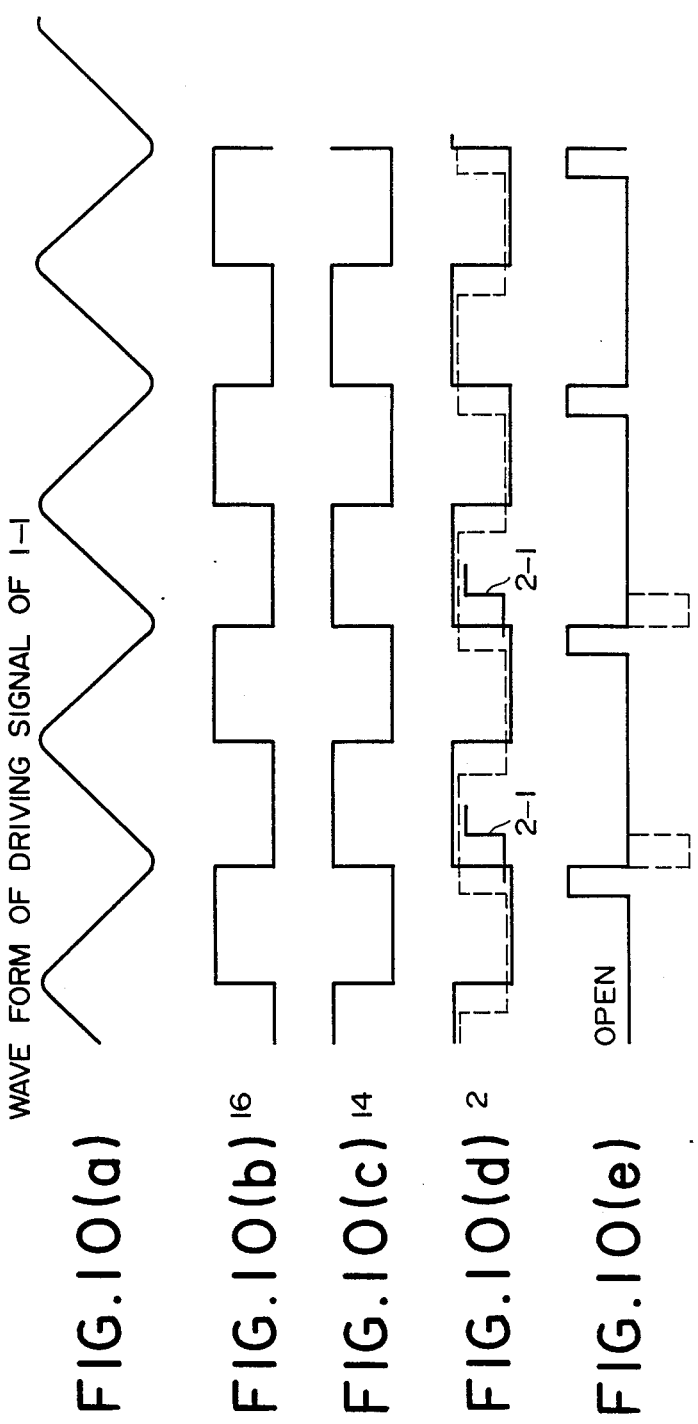

| FIG.11(a) | FIG.11(b) |
|---|---|

VIBRATION WAVE MOTOR

This application is a continuation of application Ser. No. 915,429 filed Oct. 6, 1986, now abandoned.

BACKGROUND OF THE INVENTION

1. Field of the Invention

The present invention relates to a drive circuit for an ultrasonic motor for driving a rotor by a travelling vibration wave generated by an electro-mechanical energy transducer element such as an electrostrictive element, magneto-strictive element or piezoelectric element, and more particularly to such an ultrasonic motor drive circuit having a digital control circuit.

2. Related Background Art

Various drive circuits for driving the ultrasonic motor have been proposed in view of nature that the motor is efficiently rotated only when a signal at a resonance frequency of the motor is applied.

(1) An oscillator having several oscillation frequencies is used, the respective frequencies are applied to the ultrasonic wave motor (SSM), rotation speeds are detected, and the frequency which resulted in the highest rotation speed is selected and fixed.

Alternatively, the frequency is continuously swept instead of applying several frequencies and the sweeping is stopped when the rotation speed of the SSM reaches a highest speed and the frequency is fixed thereat.

(2) A detection terminal for detecting a drive status of the SSM is provided in the SSM and a signal at the detection terminal is fed back. A high Q filter around a known resonance frequency of the SSM is inserted in a loop of a feedback circuit. A loop gain at the resonance frequency is raised so that the resonance frequency of the SSM oscillates by the feedback action and the SSM is driven by the oscillated signal.

Alternatively, instead of raising the loop gain around the resonance frequency, the SSM is forcibly driven at a frequency around the resonance frequency and a signal produced at the detection terminal by the drive is fed back so that the frequency around the resonance frequency is exactly matched to the resonance frequency, and the SSM is driven by the signal of that frequency.

Those prior art apparatus have the following disadvantages.

In the apparatus of the type (1) which selects or sweeps the drive frequency, a circuit for selecting or sweeping the frequency is necessary and means for detecting the rotation speed of the SSM is also necessary, and the circuit configuration is complex. Since the resonance frequency of the SSM changes with a load applied to the SSM or an environmental condition, it is necessary to repeatedly sweep or select the drive frequency to continuously update the drive frequency in order to attain efficient rotation.

In the apparatus of the type (2) which uses the signal at the detection terminal of the SSM, a frequency which follows the change of the load applied to the SSM or the environmental condition is obtained, but the high Q filter or an oscillation circuit which forcibely drives the SSSM only at the start is necessary. Thus, tee circuit configuration is complex and a power consumption of the circuit increases.

SUMMARY OF THE INVENTION

It is an object of the present invention to provide a drive circuit for an SSM which has a monitor electrode for detecting a drive status of the SSM, detects a phase difference between a monitor signal at the monitor electrode and a driving periodic voltage applied to drive the SSM and determines a frequency of the periodic voltage in accordance with the phase difference so that the SSM is always driven at the resonance frequency with a very simple configuration.

It is another object of the present invention to determine the frequency of the periodic voltage such that the phase difference is kept constant.

It is other object of the present invention to supply a pulsive periodic signal to be applied to a drive electrode of the SSM, convert the pulse to a sine wave with a simple configuration and apply the sine wave to the drive electrode.

Other objects of the present invention will be apparent from the following description of the preferred embodiments of the invention.

BRIEF DESCRIPTION OF THE DRAWINGS

FIG. 8 is a block diagram of a comparator 12 shown in FIG. 7, FIGS. 9A, 9B, and 9C show waveforms for explaining an operation of the comparator 12, FIGS. 10A, 10B, 10C, 10D and 10E show waveforms for explaining an operation of the circuit shown in FIG. 7.

DETAILED DESCRIPTION OF THE PREFERRED EMBODIMENTS

Figure 1:
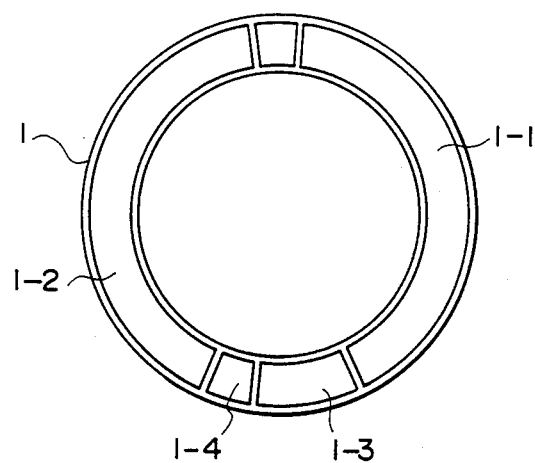
FIG. 1 shows a shape of electrodes of a stator of an ultrasonic wave motor.

FIG. 1 shows a shape of electrodes of a stator of an ultrasonic wave motor (vibration wave motor) of the present invention. Numeral 1 denotes a ring-shaped stator on which a pair of polarized electrostrictive elements are arranged or a plurality of divided electrostrictive elements are arranged Numerals 1-1 and 1-2 denote drive electrodes to which drive waveforms having a phase difference of 90° therebetween are applied. Numeral 1-3 denotes an electrode for detecting a resonant state of the stator, and numeral 1-4 denotes a common electrode connected to electrodes facing the electrodes 1-1, 1-2 and 1-3. Since the structure of the stator per se is known, detailed explanation thereof is omitted. When the drive waveforms (periodic voltages) having the phase difference of 90° are applied to the electrodes, a travelling vibration wave is generated on the surface of the stator.

Figure 2:
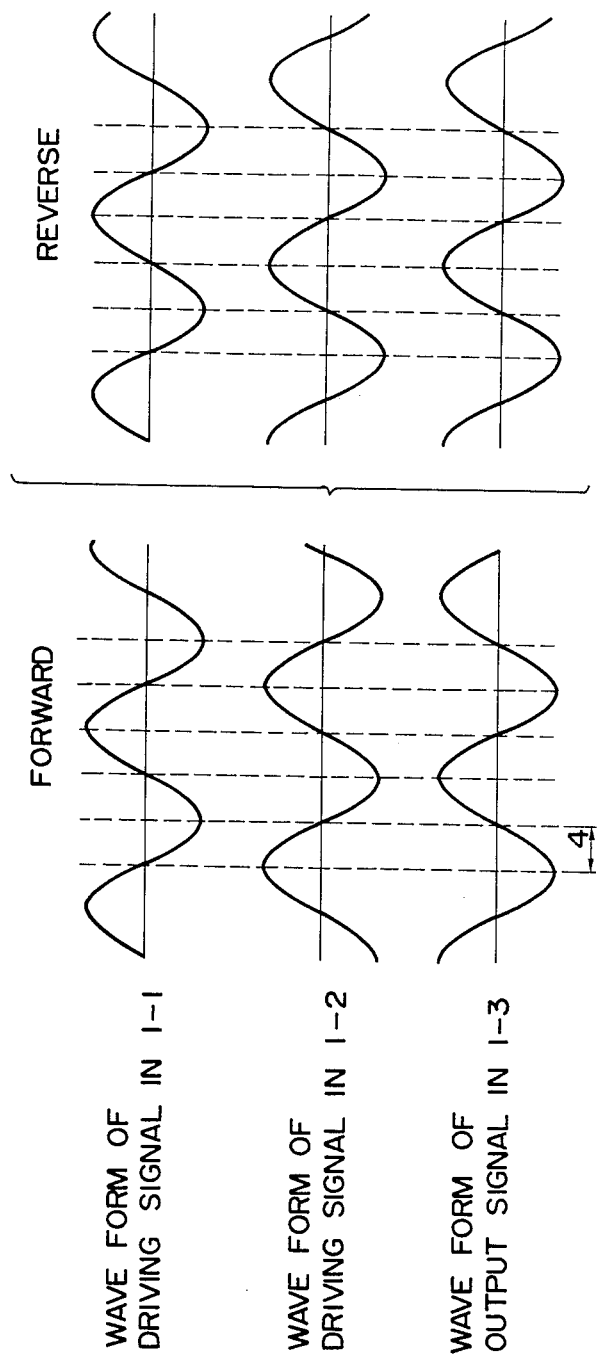
FIGS. 2A and 2B show drive waveform and output waveform of the ultrasonic wave motor.

FIG. 2 shows waveforms for illustrating a phase relationship between the drive waveforms to the electrodes 1-1 and 1-2 of the stator of the ultrasonic wave motor of FIG. 1 and the output waveform of the detection electrode 1-3 in the resonant state. The drive waveforms to the electrodes 1-1 and 1-2 of FIG. 2 A are for forwardly rotating the SSM, and the drive waveforms of the electrodes 1-1 and 1-2 of FIG. 2 B are for backwardly rotating the SSM. The electrode 1-3 is arranged such that in the resonant state in the forward or backward rotation, the output from the electrode 1-3 has a phase shifted by 90° from the waveform of the electrode 1-1. In the present embodiment, since the waveform at the electrode 1-1 is shifted 90° from the waveform at the electrode 1-3, the position of the electrode 1-3 is also shifted 90° from the position of the electrode 1-1.

Figure 3:
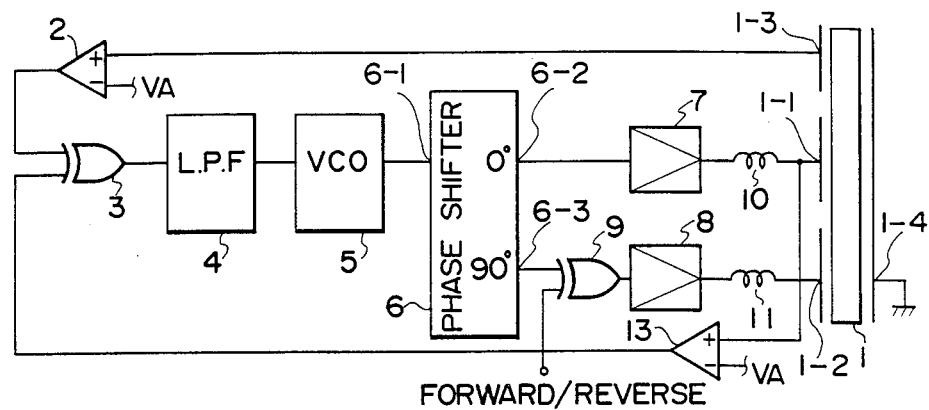
FIG. 3 is a block diagram of one embodiment of an ultrasonic wave motor of the present invention.

FIG. 3 shows a drive circuit for the SSM of the present invention. Numeral 1 denotes the stator shown in FIG. 1, numerals 1-1 to 1-4 denote the electrodes shown in FIG. 1, numeral 2 denotes a level comparator having a + input terminal thereof connected to the detection electrode 1-3 and a − input terminal thereof connected to a reference voltage VA, numeral 3 denotes an exclusive OR circuit (EX-OR) which receives the outputs of the level comparator 2 and a comparator 13 to be described later and which functions as a phase comparator, numeral 4 denotes a low-pass filter which filters the output of the EX-OR 3, numeral 5 denotes a voltage controlled oscillator (VCO) which produces a signal having a duty factor of 50% at a frequency corresponding to an input voltage and which has an input terminal thereof connected to the output terminal of the low-pass filter 4, numeral 6 denotes a phase shifter which has an input terminal 6-1 connected to the output of the VCO 5 and produces two signals having a frequency equal to one half of the output of the VCO at phases of 0° and 90° at output terminals 6-2 and 6-3, respectively, numeral 7 denotes an output circuit having an input terminal connected to the output terminal 6-2 of the shifter 6 and an output terminal thereof connected to the drive electrode 1-1 through a coil 10, and numeral 9 denotes an exclusive OR circuit having input terminals thereof connected to the output terminal 6-3 of the shifter 6 and a rotation direction control terminal and an output terminal thereof connected to a coil 11 through the output circuit 8, thence to the drive electrode 1-2. The coils 10 and 11 and the electrodes 1-1 and 1-2 form an electrical resonance circuit. The output circuits 7 and 8 are designed to have same phase between the input and output. The EX-OR 3, low-pass filter 4 and VCO 5 form a phase-locked loop (PLL).

The operation of the embodiment of FIG. 3 is now explained. When a power is turned on, voltages are supplied to the respective elements. Since the stator 1 does not initially vibrate, no signal is produced at the detection electrode 1-3 and the comparator 2 produces a low (L) signal, which is supplied to the VCO 5 through the low-pass filter 4. When the input voltage is zero, the VCO 5 oscillates at a lower limit frequency $f_o'$. The VCO 5 produces a pulse having a duty factor of 50%. The output pulse of the VCO 5 is supplied to the phase shifter 6 which produces pulses having a phase difference of 90° therebetween at the output terminals 6-2 and 6-3. The frequencies of the output pulses at the output terminals 6-2 and 6-3 are equal to one half of the frequency of the output pulse of the VCO 5. The pulse from the output terminal 6-2 of the shifter 6 is applied to the drive electrode 1-1 through the output circuit 7 and the coil 10. Since a series resonance circuit is constructed by an inductance of the coil 10, a capacitance between the electrodes 1-1 and 1-4 and a resistance, the drive waveform at the electrode 1-1 is a sine wave as shown in FIG. 2 even if the output of the shifter is a square wave (pulse).

Assuming that a forward rotation mode is now selected, the L signal is applied to one input of the EX-OR 9 and the 90° phase-advanced pulse is applied to the input of the output circuit 8. As a result, a sine wave which is 90° advanced relative to the drive waveform of the electrode 1-1, as shown in FIG. 2 A, is applied to the electrode 1-2 by the function of the coil 11 and electrodes 1-2 and 1-4. Thus, the sine waves having a phase difference of 90° therebetween are applied to the electrodes 1-1 and 1-2 and a travelling vibration wave is generated on the surface of the stator 1 so that the rotor which frictionally contacts to the surface of the stator is rotated by the vibration wave and the SSM is operated As the vibration wave is generated on the surface of the stator 1, an output waveform (sine wave) representing the vibration state is produced at the electrode 1-3 and it is applied to the comparator 2 and converted to a logic level voltage by comparison with the reference level $V_A$. As a result, a pulse having the frequency and phase of the sine wave generated at the electrode 1-3 is applied to one input terminal of the EX-OR 3.

On the other hand, the drive waveform of the electrode 1-1 is applied to the comparator 13 and converted to a logic level voltage, which is applied to the other input terminal of the EX-OR 3. Since the pulses applied to the EX-OR 3 have the same frequencies and same phases as those of the waveforms at the electrodes 1-1 and 1-3, respectively, the large the phase difference between the input waveforms is, the larger is the duty factor of the output of the EX-OR 3, which is supplied to the low-pass filter 4. The low-pass filter 4 produces a voltage level corresponding to the duty factor of the EX-OR 3 and supplies it to the VCO 5 which produces a pulse at a frequency corresponding to the input voltage level.

As described above, the frequency of the VCO has been set to $f_o'$ when the SSM is to be driven, and the frequency $f_o'$ and the frequency $f_{1-1}$ of the drive waveform of the electrode 1-1 have a relationship of $f_{1-1}=f_o'/2$. Since the signal is not yet produced at the electrode 1-3 at the start of drive of the SSM, the voltage to one input of the EX-OR 3 is L and the signal having the duty factor of 50% applied to the electrode 1-1 is supplied to the other input. Thus, the EX-OR 3 produces the pulse having the duty factor of 50%. If the VCO is conditioned such that the output frequency of the VCO is $2f_o$ for the pulse having the duty factor of 50%, the frequencies of the drive waveforms of the electrodes 1-1 and 1-2 are equal to $f_o$, and the signal at the electrode 1-3 has a phase difference of 90° from the signal at the electrode 1-1 and the output of the EX-OR 3 maintains the duty factor of 50% and the SSM is driven at the strongest resonance state.

When a high (H) voltage is applied to one input of the EX-OR 9, waveforms shown in FIG. 2B appear and the SSM is backwardly rotated.

FIG. 4 shows waveforms fore explaining the operation of the drive circuit for the SSM of the present invention shown in FIG. 3.

Figures 4A, 4B, 4C:
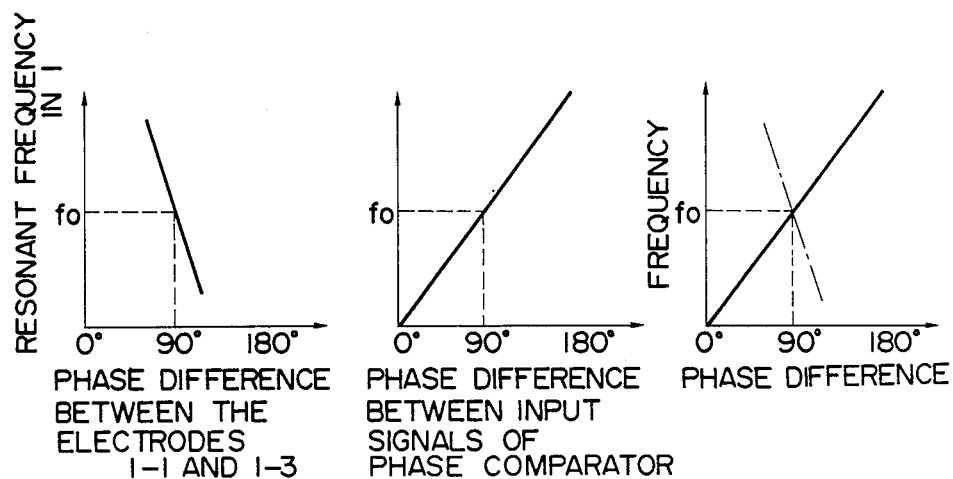
FIGS. 4A, 4B and 4C illustrates an operation of the embodiment of FIG. 3.

FIG. 4A shows a relationship between a phase difference between the waveforms at the electrodes 1-1 and 1-3 and the drive frequency of the SSM The phase difference between the output waveforms at the electrodes 1-1 and 1-3 when the SSM is driven in the strongest resonance state or at the resonance frequency $f_o$ is equal to 90°. Accordingly, when the output of the EX-OR 3 has the duty factor of 50%, the drive frequency is equal to $f_o$.

FIG. 4B shows a relationship between the phase difference between the waveform at the electrodes 1-1 and 1-3 and the drive waveform applied to the electrodes 1-1 and 1-2 by the VCO 5. As shown, the VCO 5 functions such that when the phase difference between the electrodes 1-1 and 1-3 is 90°, that is, when the duty factor of the EX-OR 3 is 50%, the frequency of the drive waveform is $f_o$. Thus, by applying the frequency $f_o$ to the electrodes 1-1 and 1-2, the phase difference between the waveforms at the electrodes 1-1 and 1-3 is equal to 90° and the SSM is stably driven at the frequency at the crosspoint of the characteristics of FIGS. 4A and 4B shown in FIG. 4C, that is, at the resonance frequency $f_o$.

Figure 5A:
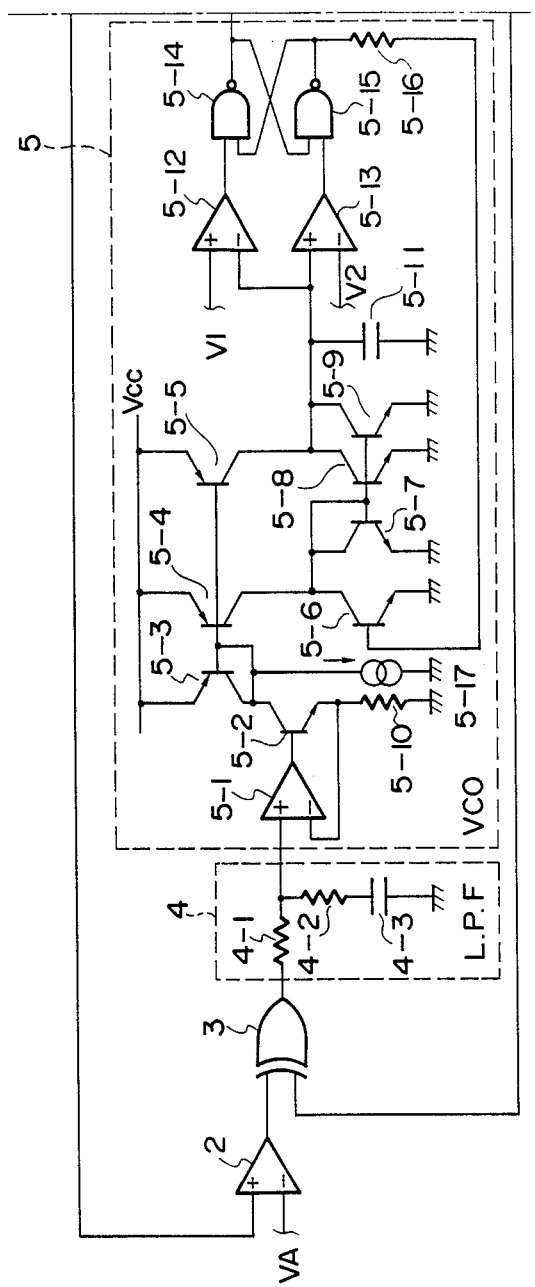
FIG. 5 shows a circuit configuration of the embodiment of FIG. 3, FIGS. 6A, 6B, 6C and 6D illustrate an operation of the embodiment of FIG. 5.
Figure 5B:
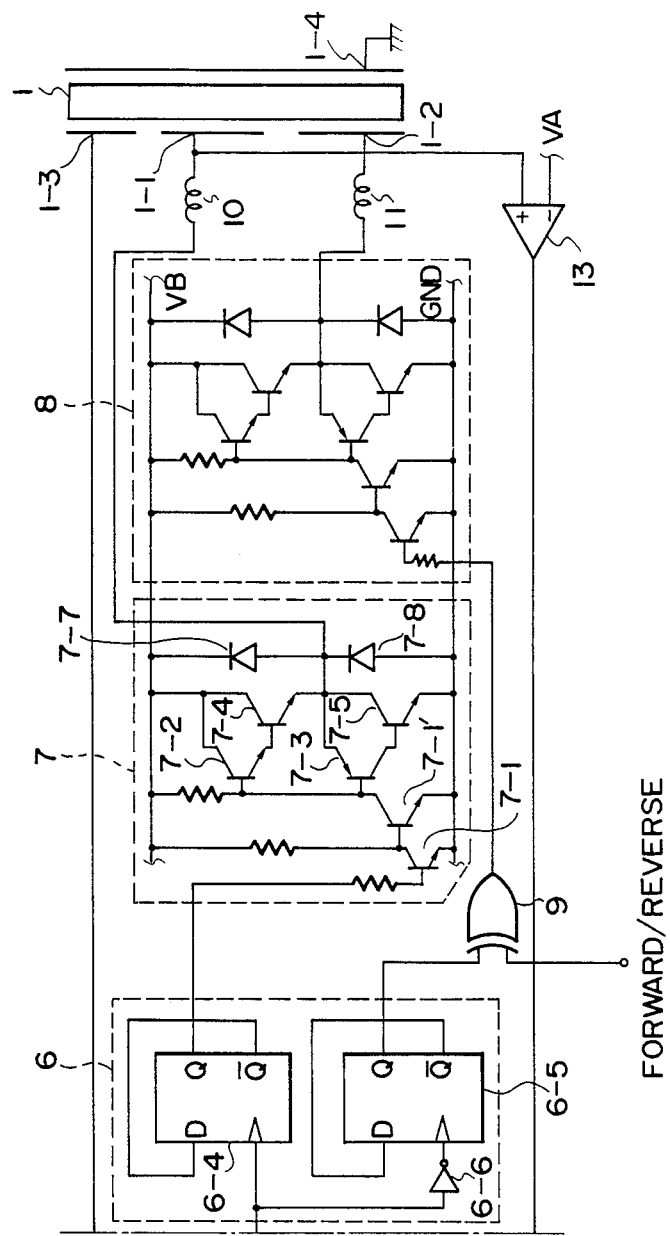

FIG. 5 shows a detailed circuit diagram of the low-pass filter 4, VCO 5, phase shifter 6 and output circuits 7 and 8 shown in FIG. 3.

The low-pass filter 4 comprises resistors 4-1 and 4-2, and a capacitor 4-3. The resistor 4-1 is connected between the input and output terminals of the low-pass filter 4, and the resistor 4-2 and the capacitor 4-3 are series-connected between the output terminal and the ground (GND). The VCO 5 comprises an operational amplifier 5-1, NPN transistors 5-2, 5-6, 5-7, 5-8 and 5-9, PNP transistors 5-3, 5-4 and 5-5, resistors 5-10 and 5-16, a capacitor 5-11, NAND gates 5-14 and 5-15, and a constant current source 5-17. The input to the VCO 5 is a + input of the operational amplifier 5-1, and a − input thereof is connected to an emitter of the transistor 5-2 and the resistor 5-10 whose other terminal is grounded. The operation a amplifier 5-1, transistor 5-2 and resistor 5-10 form a voltage − current conversion circuit which supplies a current to a collector of the transistor 5-2 in accordance with the voltage applied to the amplifier 5-1. The collector of the transistor 5-2 is connected to the collector and base of the transistor 5-3, the base of the transistors 5-4 and 5-5 and the constant current source 5-17. The transistors 5-3, 5-4 and 5-5 form a current mirror circuit.

The collector of the transistor 5-4 is connected to the collectors of the transistors 5-6 and 5-7 and the bases of the transistors 5-7, 5-8 and 5-9. The collector of the transistor 5-5 is connected to the collectors of the transistors 5-8 and 5-9, the − input of the comparator 5-12, the + input of the comparator 5-13, and the capacitor 5-11.

A reference voltage V1 is applied to the + input of the comparator 5-12, a reference voltage V2 (V1>V2) is applied to the − input of the comparator 5-13, the output of the comparator 5-12 is applied to one input of the NAND gate 5-14, and the output of the NAND gate 5-15 is applied to the other input of the gate 5-14. The output of the comparator 5-13 is applied to one input of the NAND gate 5-15 and the output of the NAND gate 5-14 is applied to the other input of the NAND gate 5-15. The gates 5-14 and 5-15 form a flip-flop, and the output of the gate 5-15 of the flip-flop is applied to the base of the transistor 5-6 through the resistor 5-16.

The phase shifter 6 comprises P flip-flops 6-4 and 6-5, and an inverter gate 6-6. The output circuit 7 comprises NPN transistors 7-1, 7-1', 7-2, 7-4 and 7-5, a PNP transistor 7-3, and diodes 7-7 and 7-8. The output circuit 8 has the same configuration as the output circuit 7.

The operation of the above circuits (low-pass filter 4, VCO 5, phase shifter 6 and output circuits 7 and 8) is now explained.

The filter 4 filters the output of the EX-OR 3, and the output voltage thereof, which increases as the duty factor of the EX-OR 3 increases, is produced in the capacitor 4-3. The filter 4 has a function to convert the duty signal of the EX-OR 3 to a voltage, which is supplied to the VCO.

Since the output of the filter 4 is supplied to the amplifier 5-1 of the VCO, a current corresponding to the output voltage of the filter 4 flows through the resistor 5-10 and the current flows through the collector of the transistor 5-2. The amplifier 5-1, resistor 5-10 and transistor 5-2 form a voltage − current conversion circuit which converts the filter output to the current. More specifically, when the output of the filter 4 is V, the voltage V is applied to the resistor 5-10 and a current $i_1 = V/R$ flows therethrough, where R is a resistance of the resistor 5-10. This current flows through the collector of the transistor 5-2, a combined current I of the current $i_1$ and a constant current $i_2$ from the constant current source 5-17 is supplied from the transistor 5-3 and the current I flows through the transistors 5-4 and 5-5 of the current mirror circuit Assuming now that the transistor 5-6 is off and the capacitor 5-11 is in a charged state, all currents flowing into the transistor 5-4 flow to the transistor 5-7, and the same current as that which flows in the transistor 5-7 flows into the transistor 5-7 and the transistors 5-8 and 5-9 of the current mirror circuit. As a result, the current flowing in the transistor 5-5 and the current flowing in the transistors 5-8 and 5-9 are equal. Thus, the current flowing into the transistor 5-5 flows from the capacitor 5-11 and the capacitor 5-11 is discharged by the current flowing in the transistor 5-5, that is, the current I.

As a result, the potential of the capacitor 5-11 drops and when it becomes lower than the reference level $V_2$, the output of the comparator 5-13 produces the L signal and the output of the NAND gate 5-15 of the flip-flop produces the H signal. Thus, the transistor 5-6 is turned on. As a result, the current flowing in the transistor 5-4 flows to the ground and the transistors 5-7, 5-8 and 5-9 are turned off. The capacitor 5-11 is charged by the current flowing in the transistor 5-5, that is, the current I and the potential of the capacitor 5-11 rises and reaches the reference level $V_1$. Thus, the comparator 5-12 produces the inverted output L and the NAND gate 5-15 produces the L signal to turn off the transistor 5-6. Then, the discharge and charge are repeated.

As described above, the capacitor 5-11 is charged and discharged at the current I of the transistor 5-4 and the current I increases as the duty factor thereof increase with the duty factor of the output pulse of the EX-OR 3, the output pulse of the NAND gate 5-14 of the flip-flop has the duty factor of 50% and the frequency which increases as the duty factor of the pulse of the EX-OR 3 increases.

The VCO is designed such that the frequency of the output pulse (output of 5-14) of the flip-flop (5-14, 5-15) is equal to $2f_o$ when the duty factor of the EX-OR 3 is 50%, that is, when the phases of the input pulses applied to the EX-OR 3 (output waveforms of the electrodes 1-1 and 1-3) have the phase difference of 90° therebetween.

At an initial stage of the drive of the SSM, the output of the EX-OR 3 is L, and the potential of the capacitor 4-3 of the low-pass filter 4 is zero. In this case, the capacitor is charged by the constant current regulated by the constant current source 5-17. The VCO is designed such that the frequency of the output pulse of the flip-flop is equal to $f_o'$ when the capacitor is charged and discharged at the constant current described above. When the SSM is driven, the drive is started at the frequency $f_o'/2$ and the VCO is set to result in a frequency no higher than the resonance frequency of the SSM.

The output pulse of the VCO thus produced is supplied to the shifter 6. Assuming that the VCO now produces the output pulse shown in FIG. 6A, the flip-flop 6-4 produces the output shown in FIG. 6C because the flip-flop 6-4 and 6-5 are flipped by the rising signals of the inputs thereto. Since the inverted pulse of the output of the VCO is applied to the flip-flop 6-5 through the inverter 6-6, the flip-flop 6-5 produces the output shown in FIG. 6D. As seen from FIGS. 6C and 6D, the flip-flops 6-4 and 6-5 of the shifter produces the pulses having a phase difference of 90° therebetween and a frequency equal to one half of the frequency of the input pulse. Thus, when the frequency of the VCO is equal to $2f_o$, the flip-flops of the shifter produces the pulses having the phase difference of 90° therebetween and having the frequency $f_o$, and those output pulses are supplied to the output circuits 7 and 8, which supply the pulses to the coils 10 and 11. While a detail is not described, the pulses from the output circuits are supplied to the coils 10 and 11 and the sine waves (shown in FIG. 2) having the same frequency and phases as those of the pulses are applied to the electrodes 1-1 and 1-2 by the function of the coils 10 and 11 and the electrodes 1-1, 1-2 and 1-4.

Figures 6A, 6B, 6C, 6D, 7:
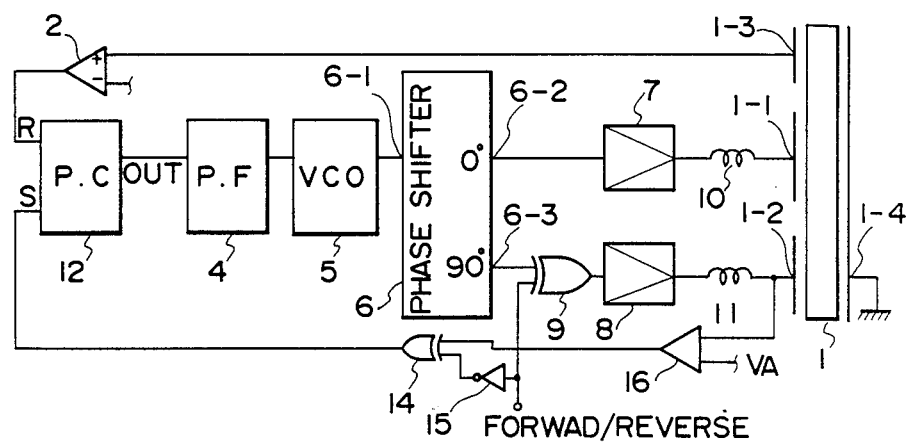
FIG. 7 is a block diagram of other embodiment of the ultrasonic wave motor of the present invention.

FIG. 7 shows another drive circuit for the SSM of the present invention. Numeral 1 denotes the stator shown in FIG. 3, numerals 1-1 to 1-4 denote the electrodes shown in FIG. 3, numeral 2 denotes a level comparator like that shown in FIG. 3 having a input terminal thereof connected to the detection electrode 1-3 and a − input terminal thereof connected to a reference voltage $V_A$, numeral 12 denotes a phase comparator having one input terminal thereof connected to the output of the comparator 2 and the other input terminal thereof connected to an output of an exclusive OR gate (EX-OR) 14 to be described later. The phase comparator 12 is known by, for example, VSP 4,291,274 and detail thereof is not explained. It produces an output only when it detects a phase difference between the input signals.

A block diagram and an input/output characteristic of the comparator 12 are shown in FIGS. 8 and 9. When an input pulse (rising pulse) to the input terminal R is applied earlier than the rising signal to the input terminal S, the output is Vcc (H) only for the differential period of the rising signals and the output is opened (high impedance) by the input of the rising signal to the input terminal S.

When the input pulse (rising pulse) to the input terminal S is applied earlier than the rising signal to the input terminal R, the output is at the ground level (L) during the rising signal period.

Except when the output is H or L, it is open. Thus, the output is open when the phase difference is zero.

Numeral 4 denotes a low-pass filler which filters the output of the comparator 12, numeral 5 denotes a voltage controlled oscillator (VCO) which produces an output signal having a duty factor of 50% at a frequency corresponding to an input voltage thereto applied from the low-pass filter 4, numeral 6 denotes a phase shifter which has an input terminal 6-1 connected to the output of the VCO 5 and which produces two signals having one half of the frequency of the output of the VCO and phases of 0° and 90°, respectively, at output terminals 6-2 and 6-3, respectively, and numeral 7 denotes an output circuit having an input terminal thereof connected to the output terminal 6-2 of the shifter 6 and an output terminal thereof connected to the drive electrode 1-1 through a coil 10. The configurations of the filter 4, VCO 5, shifter 6 and output circuit 7 are same as those in the embodiment of FIG. 3. Numeral 9 denotes an EX-OR having input terminals thereof connected to the output terminal 6-3 of the shifter 6 and a rotation direction control terminal, respectively, and an output terminal thereof connected to a coil 11 through an output circuit 8, thence to the drive electrode 1-2, numeral 16 denotes a comparator having a + input terminal thereof connected to the electrode 1-2 and a − input terminal thereof connected to the reference voltage $V_A$, and numeral 14 denotes an EX-OR having input terminals thereof connected to the output of the comparator 16 and an output of an inverter 13 and an output terminal thereof connected to the S input terminal of the comparator 12. An input terminal of the inverter 15 is connected to the rotation direction control terminal.

The comparators 2 and 16 function to lower the electrode waveforms to logic level voltages, and the phase comparator 12, low-pass filter 4 and VCO 5 form a phase locked loop (PLL). While a loop gain is high, the loop is formed and the input phase difference is rendered to be zero by a negative feedback action.

The operation of the embodiment of FIG. 7 is explained. When a power is turned on, voltages are applied to the respective elements. Since no input is initially applied to the R and S input terminals of the phase comparator 12, the output of the comparator 12 is open. Thus, the input to the low-pass filter 4 is not applied and the output of the filter 4 is at the ground level and the input voltage to the VCO 5 is zero. The VCO 5 is designed to oscillate at the lower limit resonance frequency $f_o'$ when the input voltage thereto is zero. Thus, the VCO 5 produces the pulse having the duty factor of 50% at the frequency $f_o'$. The output pulse of the VCO 5 is applied to the phase shifter 6 which produces pulses having the phase difference of 90° therebetween at the output terminals 6-2 and 6-3. The frequency of the output pulses from the output terminals 6-2 and 6-3 is equal to one half of the frequency of the output pulse of the VCO. The pulse from the output terminal 6-2 of the shifter 6 is applied to the drive electrode 1-1 through the output circuit 7 and the coil 10. Since a series resonance circuit is formed by an inductance of the coil 10, a capacitance between the electrodes 1-1 and 1-4, and a resistance, the drive waveform at the electrode 1-1 is a sine wave as shown in FIG. 2 even if the output of the shifter is a square wave (pulse). Assuming that a forward rotation mode has been selected, the L signal is applied to one input of the EX-OR 9 and the input pulse applied to the output circuit 8 is the 90° advanced pulse. As a result, a sine wave which is 90° advanced relative to the drive waveform for the electrode 1-1, as shown in FIG. 2A is applied to the electrode 1-2 by tee function of the coil 11 and the electrodes 1-2 and 1-4. Thus, the sine waves having the phase difference of 90° therebetween are applied to the electrodes 1-1 and 1-2 and a travelling vibration wave is generated on the surface of the stator 1, and the rotor which frictionally contacts to the surface of the stator is rotated by the vibration wave and the SSM is driven.

As the vibration wave is generated on the surface of the stator 1, an output waveform (sine wave) representing the vibration state is produced at the electrode 1-3 and it is supplied to the comparator 2 and limited to a logic level voltage by the reference level $V_A$, and a pulse having the frequency and phase of the sine wave generated at the electrode 1-3 is applied to the one input terminal R of the comparator 12.

On the other hand, the drive voltage of the electrode 1-1 is applied to the comparator 16 and limited to a logic level voltage, which is applied to one input terminal of the EX-OR 14. Since the output of the inverter 15 is H in the forward rotation mode, the EX-OR 14 functions as the inverter to the output of the comparator 16 and the inverted signal of the comparator 16 is applied to the input terminal S of the comparator 12. Accordingly, the input signal to the input terminal R of the comparator 12 is the pulse having the phase of the output waveform o the electrode 1-3, and the input signal to the input terminal S of the comparator 12 is the pulse having a phase which is 180° shifted from that of the drive waveform of the electrode 1-2.

The output of the comparator 16 is the pulse having the same frequency and phase as those of the drive waveform of the electrode 1-2 as shown in FIG. 10B, and it is inverted by the EX-OR 14 so that the pulse shown in FIG. 10C is supplied to the input terminal S of the comparator 12.

On the other hand, the pulse having the same frequency and phase as those of the output waveform of the electrode 1-3 is applied to the input terminal R of the comparator 12. When a pulse shown by a solid line waveform in FIG. 10D is applied to the input terminal R by the comparator 12, the input waveforms to the input terminals S and R of the comparator 12 are equal and the output of the comparator 12 maintains the open state, and the drive waveforms to the electrodes 1-1 and 1-2 are kept as they are.

The solid line waveform shown in FIG. 10D is equal to the output of the EX-OR 14 (FIG. 10C), which is shifted by 180° from the waveform of the comparator 16 (FIG. 10B). The waveform of the comparator 16 has the same frequency and phase as the drive waveform of the electrode 1-2. Consequently, the solid line waveform of FIG. 10D is the pulse waveform to the output waveform of the electrode 1-3 in FIG. 2A, which is shifted by 90° relative to the electrode 1-1. As described above, the circuit is designed such that when the SSM exhibits the strongest resonance state, the electrode 1-3 produces the output waveform (waveform 1-3 in FIG. 2A) which is shifted by 90° from the waveform of the electrode 1-1. In the above case the SSM is driven in the resonance state and it is driven at the current drive frequency.

When the phase difference between the output waveform of the electrode 1-3 and the waveform of the electrode 1-1 is larger than 90°, the output of the comparator 2 is shown by a broken line waveform in FIG. 10D. In this case, since the output of the comparator 12 is H for a period corresponding to the phase difference between the rising signals of the input pulses applied to the input terminals R and S as shown in FIG. 10E, the H period (duty factor) of the output of the comparator 12 increases as the phase difference between the drive wave to the electrode 1-1 and the output waveform of the electrode 1-3 increase from 90°.

The output of the comparator 12 is applied to the VCO through the low-pass filter 4 and the VCO produces the pulse having the duty factor of 50% at a frequency which increases as the input voltage increases. Thus, in the above case, the drive frequency applied from the shifter 6 to the electrodes 1-1 and 1-2 rises, a relationship between the phase difference between the waveforms of the electrodes 1-1 and 1-3 of the SSM and the drive frequency is shown in FIG. 4A. Since phase difference between the electrodes 1-1 and 1-3 decreases as the drive frequency rises, a negative feedback is applied by the above operation and the input waveforms to the input terminals S and R of the comparator 12 are controlled to keep the solid line relations of FIGS. 10C and 10D. Thus, the drive frequency is controlled such that the waveforms of the electrodes 1-1 and 1-3 have the relationship of the FIG. 2A, that is, a resonance state in which the output waveform of the electrode 1-3 is 90° shifted relative to the waveform of the electrode 1-1.

When the phase difference between the waveform of the electrode 1-1 and the output waveform of the electrode 1-3 is less than 90°, the output of the comparator 2 has a relationship 2-1 shown in FIG. 10D relative to the output of the EX-OR 14 (FIG. 10C). In this case, the L signal is produced only for the period corresponding to the phase difference between the rising signals of FIGS. 10C and 10D, as shown by broken lines in FIG. 10E. Since the low-pass filter 4 lowers the output in response to the L signal, the input voltage to the VCO reduces and the output frequency of the VCO also reduces. Accordingly, the frequency which causes the increase of the phase difference between the waveforms of the electrodes 1-1 and 1-3 toward 90° is selected, and the drive frequency is controlled such that the output waveform of the electrode 1-3 is shifted 90° from the waveform of the electrode 1-1 and the resonance state is attained.

In the embodiment of FIG. 7, the drive frequency is adjusted by the phase comparator such that the phase difference between the output of the comparator 21 output of the electrode 1-3) and the output of the EX-OR 14 (waveform 180° shifted from tee drive waveform of the electrode 1-2) is zero. Accordingly, even if the resonance state changes, the drive frequency which keeps the 90° phase difference between the waveforms of the electrodes 1-1 and 1-3, that is, the strongest resonance frequency is always tracked and the SMM is always driven in the resonance state. In the backward rotation mode, since the output of the inverter 15 is L, the output of the comparator 16 is supplied as it is to the input terminal of the comparator 12. Thus, the frequency which results in the phase relationship between the waveforms of the electrodes 1-1 and 1-3 as shown in FIG. 2B is always selected.

Figures 11, 11A:
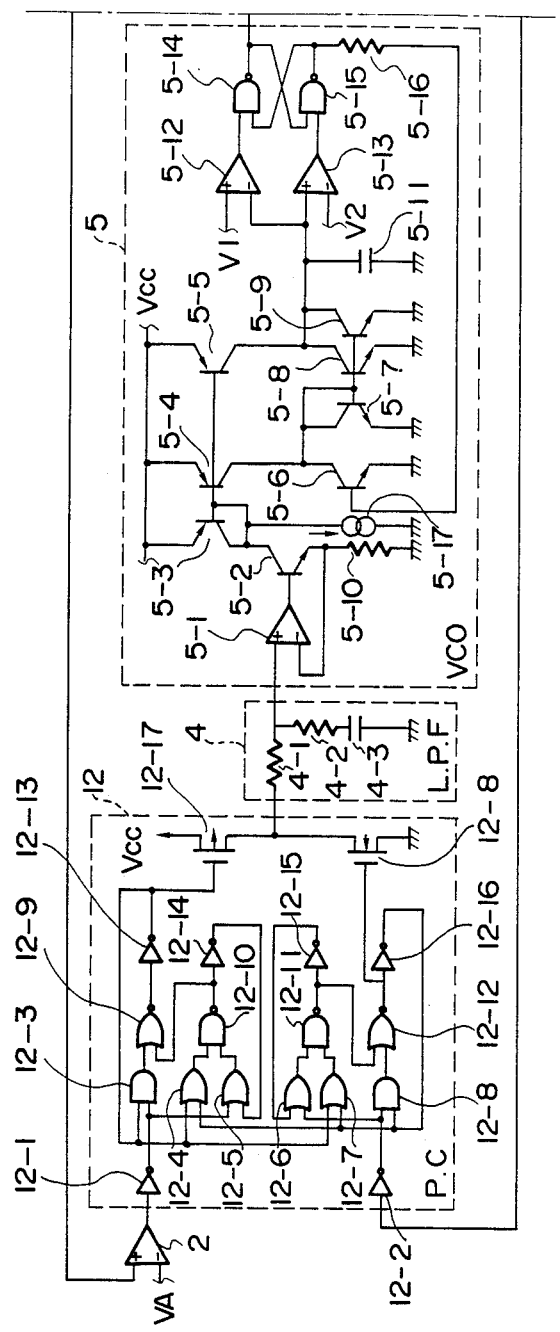
FIG. 11 shows a circuit configuration of a motor shown in FIG. 7.
Figure 11B:
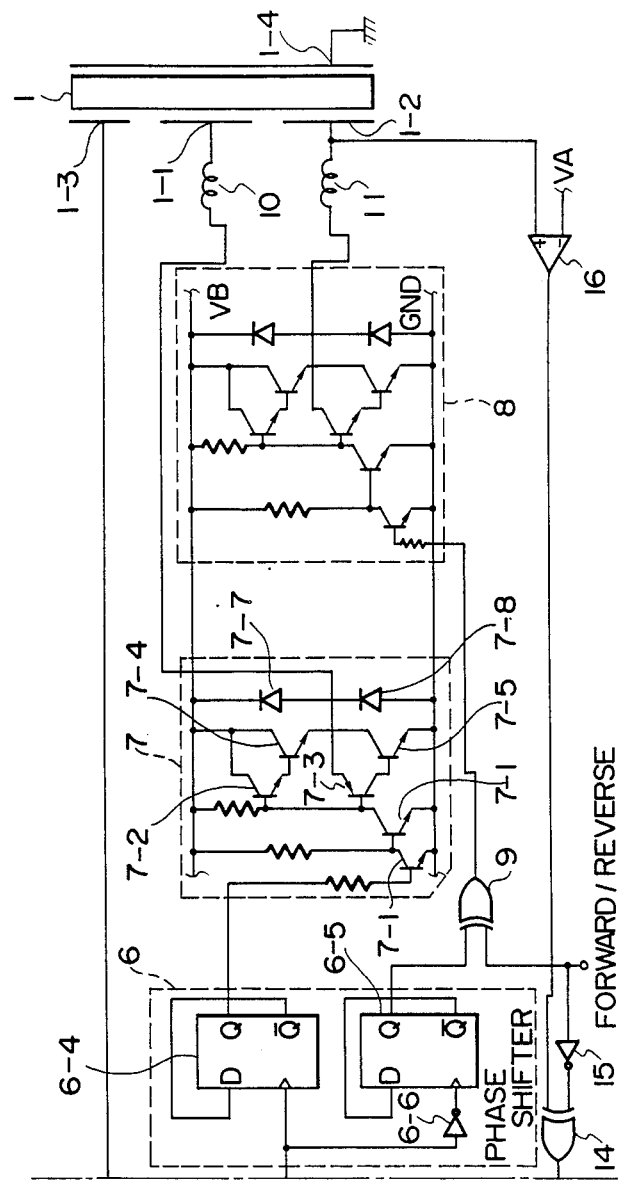

FIG. 11 shows a detailed circuit diagram of the phase comparator 12, low-pass filter 4, VCO 5, phase shifter 6 and output circuits 7 and 8 shown in FIG. 7. The phase comparator 12 comprises inverters 12-1, 12-2, 12-13, 12-14, 12-15 and 12-16, AND gates 12-3 and 12-8, OR gates 12-4, 12-5, 12-6 and 12-7, NOR gates 12-9 and 12-12, NAND gates 12-10 and 12-11, a P channel MOS FET 12-17 and an N channel MOS FET 12-18.

The comparator 12 per se is known and detailed description thereof is omitted. It has the input/output characteristic as shown in FIG. 9 and detects a phase difference between rising signals of the input pulses to indicate high, low or open state.

The low-pass filter 4, VCO 5, phase shifter 6 and output circuits 7 and 8 are identical to those shown in FIG. 5.

The operations of the circuits (low-pass filter 4, VCO 5, phase shifter 6 and output circuits 7 and 8) are explained.

The filter 4 filters the output of the comparator 12, and an output representing the output state of the comparator 12 is stored in the capacitor 4-3.

More specifically, when the phase difference between the inputs R and S of the comparator 12 is zero, that is, when the phase difference between the waveforms of the electrodes 1-1 and 1-3 is 90°, the output of the comparator 12 is open, and the potential of the capacitor 4-3 of the low-pass filter 4 is kept unchanged. When the phase difference between the waveforms of the electrodes 1-1 and 1-3 is larger than 90°, the comparator 12 produces the H signal having a duty factor determined by the phase difference and the potential of the capacitor 4-3 of the filter 4 increases. When the phase difference between the waveforms of the electrodes 1-1 and 1-3 is less than 90°, the comparator 12 produces the L signal (ground level) having the duty factor determined by the phase difference and the potential of the capacitor 4-3 drops in accordance with the duty factor.

Thus, the filter 4 has a function to convert the output of the comparator 12 to a voltage and supply it to the VCO.

The output of the filter 4 is supplied to the VCO 5 which produces the pulse having the duty factor of 50% at the frequency determined by the output of the filter 4 by the function shown in FIG. 5, and supplies the pulse to the phase shifter 6. The shifter 6 shifts the output of the VCO 5 by 90° as shown in FIG. 5 and supplies the shifted pulse to the output circuit 8. Thus, periodic voltages having a phase difference of 90° therebetween are applied to the electrodes 1-1 and 1-2.

When the waveform of the electrode 1-3 advances 90° relative to the waveform of the electrode 1-1, the output of the comparator 12 is kept open and the output of the filter 4 is kept constant. Accordingly, the VCO 5 oscillates at a constant frequency (which is two times as high as the strongest resonance frequency of the SSM) and the SSM is driven at the constant resonance frequency.

If the resonance drive state is lost by any cause and the drive frequency lowers from the resonance point and the waveform of the electrode 1-3 advances relative to the waveform of the electrode 1-1 by more than 90°, the comparator 12 produces the H output and the period thereof increases with the phase difference. Accordingly, the potential of the capacitor 4-3 of the filter 4 increases with the phase difference. As a result, the output frequency of the CCO 5 increases, and the frequencies of the drive waveforms of the electrodes 1-1 and 1-2 increases to return the frequencies of the drive waveforms to the resonance frequency. Accordingly, the phase difference between the waveforms of the electrodes 1-1 and 1-3 returns to 90° and the SSM is driven in the resonance state.

When the frequencies of the drive waveforms are higher than the resonance frequency, the waveform of the electrode 1-3 advances relative to the waveform of the electrode 1-1 by less than 90° and the comparator 12 produces the L output and the duration thereof increases with the phase difference. As a result, the potential of the filter 4 lowers and the output frequency of the VCO 5 lowers. Thus, the drive frequencies of the electrodes 1-1 and 1-3 reduce and the drive frequencies return to the resonance frequency and the waveforms to the electrodes 1-1 and 1-3 assume the resonance state.

Even if the resonance frequency itself changes by an environmental change, the phase difference between the waveforms of the electrodes 1-1 and 1-3 driven at the changed resonant frequency is 90°. Thus, in accordance with the present invention, the above phase relationship is always maintained and the SSM is stably driven at the varying resonance frequency.

In the initial stage of the drive of the SSM, the potential of the filter 4 is zero. Thus, the SSM is driven at the constant frequency defined by the constant current source 5-17. The current of the constant current source 5-17 is selected such that the constant frequency is immediately close to a frequency which is two times as high as a lower resonance frequency closest to the strongest resonance frequency. The drive of the SSM is started at such a frequency.

After the start of the drive at the above frequency, the phases are compared as described above and the frequency is gradually increased to attain the strongest resonance frequency.

In the drive circuit for the ultrasonic wave motor of the present invention, the frequency of the drive voltages is determined such that the phase difference between the output signal of the monitor electrode and the drive voltage is always maintained at the resonance phase relationship. Accordingly, the ultrasonic wave motor is always driven at the resonance state by a very simple circuit configuration.

In the present embodiment, the output of the VCO is supplied directly to the flip-flop 6-4 and to the flip-flop 6-5 through the inverter 6-6. When the flip-flop 655 is designed to flip the output in response to a falling signal, the inverter 6-6 is not necessary.

The output pulse of the VCO may be divided by a binary counter and the divided outputs may be logically operated to produce an odd-numbered pulse train and an even-numbered pulse train, which are supplied to the flip-flops 6-4 and 6-5 so that the shifter 6 produces the pulses having the phase difference of 90°.

Alternatively, the output of the flip-flop 6-4 may be flipped at a multiple of a period of the output pulse of the VCO and the output of the flip-flop 6-5 may be flipped at one-half period of the multiple of period to produce signals having a phase difference of 90° therebetween. This may be attained by dividing the output of the VCO and logically operating the divided outputs.

In the embodiment, the electrodes 1-1 and 1-3 are arranged at 90° shifted positions. When the electrode 1-3 is arranged at any position (for example, θ° shifted position) relative to the electrode 1-1, the phase difference between the waveforms of the electrodes 1-1 and 1-3 at the resonance state is equal to θ°. Accordingly, in this case, the drive frequencies to the electrodes 1-1 and 1-2 are selected such that the phase difference between the input waveforms to the phase comparator is equal to θ°.

While the electro-mechanical energy transducer element is used as the electrostrictive element in the embodiment, it may be replaced by piezoelectric element or magnetostrictive element.

We claim:

1. A control circuit for a vibration wave motor having first and second electro-mechanical energy transducing elements arranged on a vibration member for generating a travelling vibration wave by applying periodic signals respectively having phases different from each other to said first and second energy transducing elements for use as a drive force, comprising:
   (a) first detection means for detecting an output signal of an electro-mechanical energy transducing element which is arranged on said vibration member and to which said periodic signals are not applied;
   (b) second detection means for detecting a phase shift of the phase difference between the output signal detected by said first detection means and said periodic signals, from a predetermined phase; and
   (c) a frequency determination circuit for determining a frequency of the periodic signals applied to said first and second transducing elements in accordance with the phase shift detected by said second detection means;
   said predetermined phase being determined in accordance with a positional relationship between the transducing element to which the periodic signals are applied and the transducing element which produces the output signal.

2. A control circuit for a vibration wave motor according to claim 1 wherein said first electro-mechanical energy transducing element to which the periodic signals are applied includes first and second groups of elements arranged at different positions on said vibration member, wherein periodic signals of different phases are applied to the respective groups of elements, and wherein said second detection means detects the phase shift of the phase difference between the periodic signals applied to one group and the output signal, from said predetermined phase.

3. A control circuit for a vibration wave motor according to claim 2 wherein said energy transducing elements are electrostrictive elements.

4. A control circuit for a vibration wave motor according to claim 2 wherein said energy transducing elements are piezoelectric elements.

5. A control circuit for a travelling vibration wave motor for driving a movable member by a travelling vibration wave generated by applying a periodic voltage to an electro-mechanical energy transducing element, comprising:
   (a) a pulse signal generation circuit for generating a pulse having a predetermined repetition period; and
   (b) an electrode for applying said pulse to an electro-mechanical energy transducing element through a coil.

6. A control circuit for a vibration wave motor according to claim 5 wherein said electromotor mechanical energy transducing element includes first and second groups of elements arranged at different positions on a vibration member, and said pulse signal generation circuit generates pulses of different phases and the generated pulses are applied to the first and second group of elements through the corresponding electrodes.

7. A control circuit for a vibration wave motor according to claim 1 wherein said energy transducing element is an electrostrictive element.

8. A control circuit for a vibration wave motor according to claim 1 wherein said energy transducing element is a piezoelectric element.

9. A control circuit for a travelling vibration wave motor according to claim 6 wherein the frequency determined by said frequency determination circuit increases as said phase difference increases and decreases as said phase difference decreases.

10. A control circuit for a travelling vibration wave motor according to claim 5 wherein the frequency determined by said frequency determination circuit increases as said phase difference increases and decreases as said phase difference decreases.

11. A control circuit for a vibration wave motor according to claim 5 wherein said energy transducing element is an electrostrictive element.

12. A control circuit for a vibration wave motor according to claim 5 wherein said energy transducing element is a piezoelectric element.

13. A control circuit for a vibration wave motor according to claim 6 wherein said energy transducing elements are electrostrictive elements.

14. A control circuit for a vibration wave motor according to claim 6 wherein said energy transducing elements are piezoelectro elements.

15. A travelling vibration wave motor according to claim 1, wherein said detection circuit comprises:
   a phase comparator for outputting pulses having a duty cycle and polarity in accordance with the phase difference between said periodic signals; and
   a pulse-voltage converting circuit for changing the voltage level of a signal output by said converting circuit on the basis of the output pulses from said phase comparator; and
   wherein said frequency determination circuit includes an oscillating circuit the output frequency of which is changed according to the output level of said pulse-voltage converting circuit, and wherein the frequency of the periodic signal is determined by the output frequency of said oscillating circuit.

16. A travelling vibration wave motor according to claim 14, wherein said detection circuit comprises:
   a phase comparator for outputting pulses having a duty cycle and polarity i accordance with the phase difference between said periodic signals; and
   a pulse-voltage converting circuit for changing the voltage level of a signal output by said converting circuit on the basis of the output pulses from said phase comparator; and
   said frequency determination circuit includes an oscillating circuit the output frequency of which is changed according to the output level of said pulse-voltage converting circuit, and wherein the frequency of the periodic signal is determined by the output frequency of said oscillating circuit.

17. A control circuit for a travelling vibration wave motor for moving a member by a travelling vibration wave generated by applying periodic signals which respectively have phases different from each other to first and second electro-mechanical energy transducing element parts comprising:
   (a) detecting means for detecting a drive state of the motor driven by the travelling vibration wave and producing a periodic signal representing the drive state of the motor;
   (b) a detection circuit for detecting a phase difference between the periodic signal from said detecting means and the periodic signal applied to said first electro-mechanical energy transducing element part.

18. A control circuit for a travelling vibration wave motor according to claim 17 wherein said first and second electro-mechanical energy transducing element parts are arranged on a vibration member, wherein the periodic signals are applied to said first and second transducing element parts by application means, wherein said detecting means includes another electro-mechanical energy transducing means which is arranged on the vibration member at a position to which the periodic signal is not applied, and wherein said circuit further comprises take-out means for taking out an output signal from said another transducing means so that the periodic signal representing the drive state of the motor is produced by said take-out means, a frequency determination circuit for determining the frequency of the periodic signals applied to said first and second electro-mechanical energy transducing elements parts in accordance with the phase difference detected by said detection circuit.

19. A control circuit for a travelling vibration wave motor according to claim 18, wherein the phase difference of the periodic signals applied to said first and second electro-mechanical energy transducing element parts is 90 degrees.

20. A control circuit for a travelling vibration wave motor according to claim 18, wherein said detection circuit detects the phase difference in accordance with the amount of the shift of the phase difference between the periodic signal applied to said first electro-mechanical energy transducing element part and the periodic signal outputted by said another electro-mechanical energy transducing means by a predetermined phase difference, the predetermined phase difference being determined by the phase difference between the positions of said first electro-mechanical energy transducing element part and said another electro-mechanical energy transducing means on the vibration member.

21. A control circuit for a travelling vibration wave motor according to claim 20, wherein the predetermined phase difference coincides with the phase difference between the positions of said first electro-mechanical energy transducing element part and said another electro-mechanical transducing element part and said another electro-mechanical energy transducing means.

22. A control circuit for a travelling vibration wave motor according to claim 17 further comprising frequency determination circuit for determining the frequency of the periodic signals applied to said first and second electro-mechanical energy transducing element parts in accordance with the phase difference detected by said detection circuit, wherein the frequency determined by said frequency determination circuit increases as the phase difference increases and decreases as said the difference decreases.

23. A control circuit for a travelling vibration wave motor according to claim 17 wherein said energy transducing element parts are electrostrictive element parts.

24. A control circuit for a vibration wave motor according to claim 17 wherein said energy transducing element parts are piezoelectric element parts.

25. A vibration wave motor comprising;
  (a) vibration member having first and second electro-mechanical energy transducing element parts arranged thereon;
  (b) application means for applying periodic signals which respectively have phases different from each other to said first and second electro-mechanical energy transducing element parts to generate a travelling vibration wave as a drive force;
  (c) detection means for detecting a signal produced by another electron-mechanical energy transducing element part arranged on said vibration member at a position electrically insulated from said application means;
  (d) a detection circuit for detecting the phase difference between a periodic signal applied to said first transducing element part and the signal detected by said detection means; and
  (e) a frequency determination circuit for determining the frequency of the periodic signals applied to said first and second electro-mechanical energy transducing element parts in accordance with the phase difference detected by said detection circuit.

26. A vibration wave motor according to claim 25 wherein said first electro-mechanical energy transducing element part includes a first group of elements arranged at predetermined positions on said vibration member and said second electro-mechanical energy transducing element part includes a second group of elements arranged at different positions from the positions of said first group of elements, and wherein said applications means applies the periodic signals of different phases to said first group of elements and to said second group of elements, respectively.

27. A vibration wave motor according to claim 25 wherein said energy transducing element parts are electrostrictive element parts.

28. A vibration wave motor according to claim 25 wherein said energy transducing element parts are piezoelectric element parts.

29. A control circuit for a travelling vibration wave motor for moving a member by a travelling vibration wave generated by applying periodic signals which respectively have phases different from each other to first and second electro-mechanical energy transducing element parts, comprising:
  (a) detecting means for detecting a drive state of the motor driven by the travelling vibration wave and producing a periodic signal representing the drive state of the motor;
  (b) a detection circuit for detecting a phase difference between the periodic signal from said detecting means and the periodic signal applied to said first electro-mechanical energy transducing element part and for detecting the phase shift between the detected phase difference value and a predetermined phase difference; and
  (c) a frequency control circuit for controlling the frequency of the periodic signals applied to said first and second electro-mechanical energy transducing element parts to reduce the phase shift detected by said detection circuit.

30. A control circuit for a travelling vibration wave motor according to claim 29 wherein said first and second electro-mechanical energy transducing element parts are arranged on a vibration member, wherein the periodic signals are applied to said first and second transducing element parts by application means, wherein said detecting means includes another electro-mechanical energy transducing means which is arranged on the vibration member at a position to which the periodic signal is not applied, and wherein said circuit further comprises take-out means for taking out an output signal from said another transducing means so that the periodic signal representing the drive state of the motor is produced by said take-out means.

31. A control circuit for a vibration wave motor according to claim 30 wherein the predetermined phase difference is determined in accordance with a positional relationship between said energy transducing element part to which the periodic signal is applied and said another energy transducing means arranged at the position to which the periodic signal is not applied.

32. A control circuit for a vibration wave motor according to claim 30 wherein said first electro-mechanical energy transducing element part includes a first group of elements arranged at predetermined positions on the vibration member and said second electro-mechanical energy transducing element part includes a second group of elements arranged at different positions from the first group of elements, and wherein said application means applies the periodic signals of different phases to said first group of elements and to said second group of elements, respectively.

33. A control circuit for a vibration wave motor according to claim 32 wherein the predetermined phase difference is determined in accordance with a positional relationship between said first group of elements to which the periodic voltage is applied and said another energy transducing element means arranged at the position to which the periodic signal is not applied.

34. A control circuit for a vibration wave motor according to claim 33 wherein said electro-mechanical energy transducing element parts are electrostrictive elements.

35. A control circuit for a vibration wave motor according to claim 33 wherein said electro-mechanical energy transducing element parts are piezoelectric elements.

36. A control circuit for a travelling vibration wave motor according to claim 30 wherein said frequency control circuit controls the frequency of the periodic signals such that the frequency of the periodic signals increases as the phase shift increases and the frequency of the periodic signals decreases as the phase shift decreases.

37. A control circuit for a travelling vibration wave motor according to claim 29 wherein said detection circuit assumes a first output state when the phase difference between the periodic signals is larger than the predetermined phase difference and assumes a second output state when the phase difference between the periodic signals is smaller than the predetermined phase difference and wherein said frequency control circuit changes the frequency of the periodic signals in one direction when said detection circuit assumes the first output state and changes the frequency of the periodic signals in the other direction when said detection circuit assumes the second output state.

38. A control circuit for a vibration wave motor according to claim 29 wherein said energy transducing element parts are electrostrictive element parts.

39. A control circuit for a vibration wave motor according to claim 29 wherein said energy transducing element parts are piezoelectric element parts.

40. A vibration motor comprising:
 (a) a vibration member having first and second electro-mechanical energy transducing element parts arranged thereon;
 (b) application means for applying periodic signals having different phases from each other to said first and second electro-mechanical energy transducing element parts, to generate a travelling vibration wave as a drive force;
 (c) detection means for detecting a signal produced by another electro-mechanical energy transducing element part arranged on said vibration member at a position electrically insulated from said application means;
 (d) a detection circuit for detecting a phase difference between the periodic signal from said detecting mean and the periodic signal applied to said first electro-mechanical energy transducing element part and for detecting the phase shift between the detected phase difference and a predetermined phase difference;
 (e) a frequency control circuit for controlling the frequency of the periodic signals applied to said first and second electro-mechanical energy transducing element parts to reduce the phase shift value detected by said detection circuit.

41. A vibration wave motor according to claim 40 wherein the predetermined phase difference is determined in accordance with a positional relationship between said energy transducing element part to which the periodic signal is applied and the energy transducing element part insulated from said application means.

42. A vibration wave motor according to claim 40 wherein said electro-mechanical energy transducing element parts are electrostrictive element parts.

43. A vibration wave motor according to claim 41 wherein said electro-mechanical energy transducing element parts are piezoelectric element parts.

44. A vibration wave motor according to claim 40, wherein said first electro-mechanical energy transducing element part includes a first group of elements arranged at predetermined positions on said vibration member and said second electro-mechanical energy transducing element part includes a second group of elements arranged at different positions from said first group of elements, and wherein said application means applies the periodic signals of different phases to said first group of elements and to said second group of elements, respectively.

45. A vibration wave motor according to claim 44 wherein the predetermined phase difference is determined in accordance with a positional relationship between said first group of elements to which the periodic signal is applied and the electro-mechanical energy transducing element part insulated from said application means.

46. A vibration wave motor according to claim 45 wherein said electro-mechanical energy transducing element parts are electrostrictive elements.

47. A vibration wave motor according to claim 45 wherein said electro-mechanical energy transducing element parts are piezoelectric elements.

48. A vibration wave motor according to claim 40 wherein said frequency control circuit controls the frequency of the periodic signals such that the frequency of the periodic signals increases as the phase shift increases and the frequency of the periodic signals decreases as the phase shift decreases.

49. A vibration wave motor according to claim 40 wherein said detection circuit assumes a first output state when the phase difference is larger than the predetermined phase difference and assumes a second output state when the phase difference is smaller than the predetermined phase difference, and wherein said frequency control circuit changes the frequency in one direction when said detection circuit assumes the first output state and changes the frequency in the other direction when said detection circuit assumes the second output state.

50. A vibration wave motor according to claim 40 wherein said electro-mechanical energy transducing element parts are electrostrictive parts.

51. A vibration wave motor according to claim 40 wherein said electro-mechanical energy transducing element parts are piezoelectric element parts.

52. A vibration wave motor comprising:
(a) a vibration member;
(b) a first group of electro-mechanical energy transducing elements and a second group of electro-mechanical energy transducing elements arranged at different positions on said vibration member;
(c) first and second application means for applying periodic signals at different phases to said first and second groups of electro-mechanical energy transducing elements to generate a travelling vibration wave as a drive force;
(d) an electro-mechanical energy transducing element arranged at a different position on said vibration member from said first and second groups of electro-mechanical energy transducing elements for producing a periodic signal representing a vibration state of the travelling vibration wave;
(e) a frequency determination circuit for determining the frequency of the periodic signals applied to said first and second group of electro-mechanical energy transducing elements through said application means in accordance with the phase difference between the periodic signal applied to said first group of electro-mechanical energy transducing elements and the periodic signal representing the vibration state so that the phase difference is maintained at a specified value.

53. A vibration motor device comprising:
(a) a vibration member having first and second electro-mechanical energy transducing element parts arranged thereon;
(b) application means for applying periodic signals having different phases from each other to said first and second electro-mechanical energy transducing element parts, to generate a travelling vibration wave as a drive force;
(c) detecting means for detecting the drive state of said motor driven by the travelling vibration wave and producing a periodic signal representing the drive state of the motor; and
(d) a detection circuit for detecting the phase difference between the periodic signal from the detecting means, the periodic signal applied to said first electro-mechanical energy transducing element part and the resonance vibration state of the motor being monitored by detecting the phase difference with said detection circuit.

* * * * *

UNITED STATES PATENT AND TRADEMARK OFFICE
CERTIFICATE OF CORRECTION

PATENT NO. : 4,833,358

DATED : May 23, 1989

INVENTOR(S) : Nobuyuki Suzuki, et al.

It is certified that error appears in the above-identified patent and that said Letters Patent is hereby corrected as shown below:

On the title page:

AT [30] Foreign Application Priority Data:

Insert --Oct. 9, 1985 [JP] Japan ...... 60-226567--.

FIG. 7 (Sheet 6 of 10):

"FORWAD/REVERSE" should read --FORWARD/REVERSE--.

COLUMN 1:

Line 66, "SSSM" should read --SSM--, and "tee" should read --the--.

COLUMN 2:

Line 57, "arranged" should read --arranged.--.

COLUMN 4:

Line 19, "operated" should read --operated.--.

Line 63, "fore" should read --for--.

Line 68, "SSM" should read --SSM.--.

UNITED STATES PATENT AND TRADEMARK OFFICE
CERTIFICATE OF CORRECTION

PATENT NO. : 4,833,358
DATED : May 23, 1989
INVENTOR(S) : Nobuyuki Suzuki, et al.

It is certified that error appears in the above-identified patent and that said Letters Patent is hereby corrected as shown below:

COLUMN 5:

Line 37, "grounded" should read --grounded.--.

Line 38, "operation a amplifier 5-1," should read --operational amplifier 5-1,--.

COLUMN 6:

Line 33, delete "flows into the transistor 5-7".

COLUMN 7:

Line 40, "input terminal" should read -- + input terminal--.

Line 48, "VSP 4,291,274" should read --U.S. Pat. No. 4,291,274--.

COLUMN 8:

Line 66, "tee" should read --the--.

COLUMN 9:

Line 24, "o" should read --of--.

UNITED STATES PATENT AND TRADEMARK OFFICE
CERTIFICATE OF CORRECTION

PATENT NO. : 4,833,358

DATED : May 23, 1989

INVENTOR(S) : Nobuyuki Suzuki, et al.

It is certified that error appears in the above-identified patent and that said Letters Patent is hereby corrected as shown below:

COLUMN 10:

Line 44, "comparator 21" should read --comparator 2--.

Line 45, "output" (first occurrence) should read --(output--.

Line 46, "tee" should read --the--.

Line 51, "SMM" should read --SSM--.

COLUMN 11:

Line 57, "CCO 5" should read --VCO 5--.

COLUMN 12:

Line 38, "flip-flop 655" should read --flip-flop 6-5--.

COLUMN 13:

Lines 56-57, "electromotor mechanical" should read --electro-mechanical--.

COLUMN 14:

Line 2, "Claim 6" should read --Claim 5--.

Line 22, "piezoelectro" should read --piezoelectric--.

Line 42, "i" should read --in--.

UNITED STATES PATENT AND TRADEMARK OFFICE
CERTIFICATE OF CORRECTION

PATENT NO. : 4,833,358

DATED : May 23, 1989

INVENTOR(S) : Nobuyuki Suzuki, et al.

It is certified that error appears in the above-identified patent and that said Letters Patent is hereby corrected as shown below:

COLUMN 15:

Line 14, "means, a" should read --means, and a--.

Line 17, "elements" should read --element--.

Line 44, delete "transducing element part and said".

Line 45, delete "another electro-mechanical".

Line 59, "vibration wave motor" should read --travelling vibration wave motor--.

Line 63, "vibration member" should read --a vibration member--.

COLUMN 16:

Line 4, "electron-mechanical" should read --electro-mechanical--.

Line 25, "applications means" should read --application means--.

UNITED STATES PATENT AND TRADEMARK OFFICE
CERTIFICATE OF CORRECTION

PATENT NO. : 4,833,358

DATED : May 23, 1989

INVENTOR(S) : Nobuyuki Suzuki, et al.

It is certified that error appears in the above-identified patent and that said Letters Patent is hereby corrected as shown below:

COLUMN 18:

Line 10, "mean" should read --means--.

Line 14, "difference;" should read --difference; and--.

COLUMN 19:

Line 27, "wave;" should read --wave; and--.

COLUMN 20:

Line 1, "group" should read --groups--.

Signed and Sealed this

Thirty-first Day of December, 1991

Attest:

HARRY F. MANBECK, JR.

*Attesting Officer*     *Commissioner of Patents and Trademarks*